Jan. 22, 1957   J. S. BROWN   2,778,488
EDUCATIONAL OR INSTRUCTIVE CHILD'S KNITTING KIT
Filed Jan. 30, 1956

INVENTOR
JOAN S. BROWN

BY *A. Yates Dowell*
ATTORNEY

United States Patent Office 2,778,488
Patented Jan. 22, 1957

2,778,488

EDUCATIONAL OR INSTRUCTIVE CHILD'S KNITTING KIT

Joan S. Brown, Washington, D. C.

Application January 30, 1956, Serial No. 562,046

7 Claims. (Cl. 206—47)

This invention relates to the securing and maintaining of attention and interest of children of pre-school and early school ages and in giving instruction which will be of value and form a part of their general education and training all of which will contribute to the formation of character.

The invention relates also to an instructive or educational device or instrumentality by which the attention of school children can be attracted and retained for a substantial period as well as a device by the use of which learning will be derived of a character that will prove of value to the child in later years.

It has been learned by observation that the attention of children of pre-school and early school ages can be retained only for a limited period and that it is desirable to keep children occupied for their best physical, mental and spiritual welfare since idleness has proven to be the devil's workshop.

Considerable attention has been given to ways of securing and maintaining the interest of children and motivating their efforts along proper or desired lines not only to amuse them, occupy their time and keep them out of mischief but to provide instruction and worthwhile education which will be of subsequent benefit.

It is an object of the invention to accomplish the above by providing something which a child can handle or feel and can visualize, which solicits the attention and activity of a child especially in the use of the hands and in a way that not only will provide training, but which at the same time will be attractive, interesting, amusing and motivating with a step-by-step unfolding or progression in anticipation of a sense of reward or satisfaction for what has been done as well as a desire to complete the work in hand and obtain a greater satisfaction or reward.

Another object of the invention is to provide an object or device by which the above results can be obtained, which object is simple, inexpensive, readily available and comprises a principal surprise which forms a core on which yarn is wound and in which additional surprises are incorporated located at successively different distances from the exterior of the ball for successive finding by the individual as the yarn is unwound, and which ball is encased in a colorless plastic, tied with a bow of ribbon and a knot by which a couple of single-point knitting needles also are fastened to the package, and which package can be sold singly or in multiples.

Figure 1:
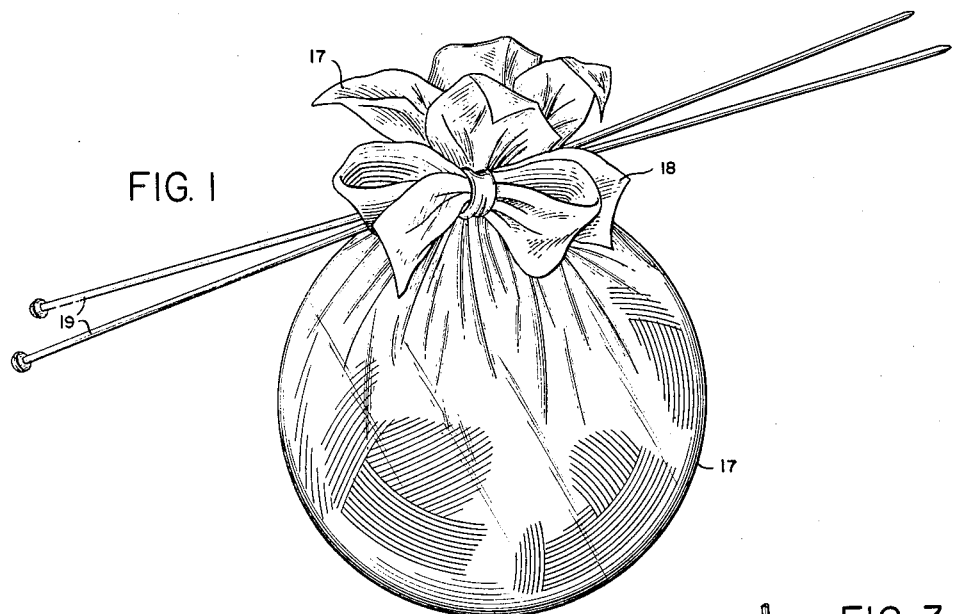
Figure 2:
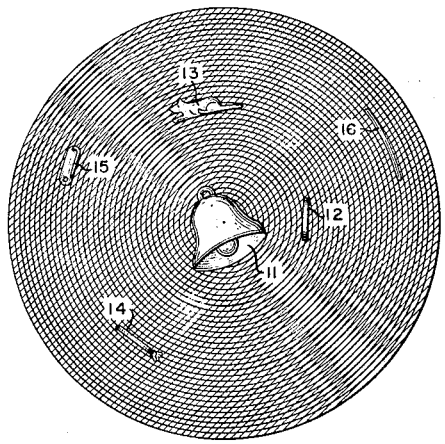

Other objects and advantages of the invention will be apparent from the following description taken in conjunction with the accompanying drawing wherein:

Fig. 1 is a perspective illustrating one application of the invention;

Fig. 2, a diametrical section; and

Figure 3:
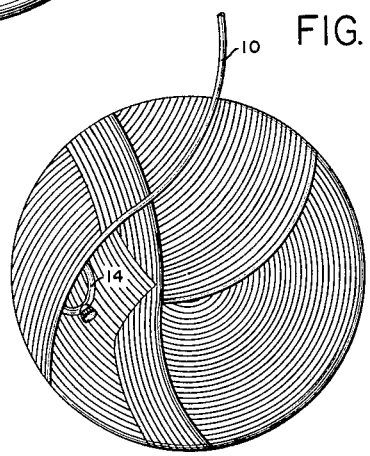

Fig. 3, a perspective of the ball partially unwound.

The present invention is an object or device designed to intrigue or motivate pre-school and early school age tots both boys and girls as well as their elders. It is particularly intended to promote wholesome activity which not only will keep the individual out of mischief but will be interesting, amusing, instructive and educational, will include instruction in the use, character, quality and quantity of materials such as yarn, and teach skill in the use and handling of the same including the knitting of objects.

The invention comprises a strand of wool or yarn, preferably four-ply knitting worsted and preferably of various colors, with such yarn wound into a ball slightly larger than a baseball or approximately three inches in diameter or larger and weighing approximately half an ounce or more. The yarn is wound in such a manner that each color forms a separate layer and is covered by another color. Incorporated within this ball of yarn are prizes, charms and surprises preferably colored or attractive in appearance to the children and located at intervals between the surfaces of the ball and the center.

Over the ball is applied a sheet of clear or other plastic to reveal the contents, which is combined to provide an ornamental flared type gathering at the top with a bow around the neck of the same, beneath which also a pair of single end preferably colored anodized aluminum knitting needles are adapted to be secured.

With continued reference to the drawing, a strand 10 is provided preferably of multi-colored yarn known as four-ply knitting worsted yarn and a central prize or grand prize is selected and which is used as a core 11 upon which yarn is wound until a mass or ball of predetermined size is obtained. Incorporated within this mass or ball at progressively varying distances between the core 11 and the outer surface are additional prizes including, for example, a coin 12, an animal 13, a finger ring 14, a capsule with a small ball therein known as a synthetic jumping bean 15, and a charm 16 for a bracelet, necklace or the like. The prizes or pleasantries which are adapted to be found and to produce pleasant sensations in the finder may be of widely varied character, such as objects of plastic or other appropriate material, and simulating objects having motion or not, such as for example, cars or other vehicles, animals (cats, dogs, horses), soldiers' whistles, or other objects of relatively small size and capable of being easily embedded in the ball of yarn.

The mass or ball of yarn with its incorporated surprises is preferably encased in a clear plastic wrapper 17, so that the colored yarn is visible. The wrapper is gathered together and secured in such position by a bow of ribbon 18 which is also employed to attach a pair of colored anodized aluminum single point knitting needles 19.

The device indicated, due to the bright colors of the yarn, knitting needles and bow of ribbon, and the transparent wrapping, is attractive to the eye, and due to the articles which are incorporated therein provides great promise and unusual stimulation of interest to small children and adults as well. The incorporation of the prizes is also susceptible of almost unlimited possibilities of variations and provides wide appeal to both male and female of wide age ranges; for example, the charm and ring items which can be worn, the jumping bean with which to play and due to the noise or sound produced also gives pleasure, the small animals which can be loved, the coin which can be owned and possessed suggesting something of intrinsic value, and the grand prize connotating something which affords music to the ears and attracts the attention of others.

The flexibility of the device is almost unlimited since it can be used for shutins to provide interest and to amuse and absorb so that quiet can be maintained. It is something to be appreciated and enjoyed, teaches skill and dexterity to the hands, can be used for teaching subjects of many kinds including about the earth or geography, the flora and fauna thereon, the creations of man such as our homes, its furnishings, the utensils found in connection therewith including manufactured items for amusing and serving the nations of the world and in the defense of our country including the different branches of our armed forces, and many other things. The device has a lasting effect that does not terminate in a worthless pile of scrap even after it has served its purpose there being left at least a pair of knitting needles, yarn either knitted or not, a series of prizes, and of greatest importance a pleasant lasting impression.

It will be apparent from the foregoing that the device of the present invention is worthwhile from many angles including its use in instructing, its attractiveness on special occassions such as Christmas, birthdays as a favor for children and giving people recuperating something to do with their hands to keep them quiet, and as a memorable article.

It will be obvious to those skilled in the art that various changes may be made in the invention without departing from the spirit and scope thereof and therefore the invention is not limited by that which is illustrated in the drawing and described in the specification, but only as indicated in the appended claims.

What is claimed is:

1. A decorative, educational device comprising a package including a core, a series of strands of multi-colored yarn wound upon said core and forming a ball, a series of prizes distributed within said yarn located at different distances from said core and adapted to be discovered one at a time as the yarn is unwound, and a pair of single end colored anodized aluminum knitting needles, a wrapper for said ball, said wrapper comprising a sheet of colored plastic having its ends gathered together, and a bow of ribbon of a color which contrasts with the color of the yarn on the exterior of said ball, binding said gathered ends together and fastening said knitting needles to the package.

2. A decorative, educational device comprising a package including a core, a series of strands of multi-colored yarn wound upon said core and forming a ball, a series of prizes distributed within said yarn located at different distances from said core and adapted to be discovered one at a time as the yarn is unwound, a pair of knitting needles, a wrapper for said ball, said wrapper comprising a sheet of colored plastic having its ends gathered together, and fastening means binding said gathered ends together with said knitting needles to the package.

3. An educational or instructive child's knitting kit comprising a package including a transparent wrapping, a pair of knitting needles, and a ball of yarn, a bow of ribbon fastening said transparent wrapping about said yarn and knitting needles tieing them together, and a series of surprises incorporated within said ball of yarn for promoting the use of the yarn in knitting.

4. An educational or instructive child's knitting kit comprising a package including a transparent wrapping, a pair of knitting needles, a ball of yarn, fastening means securing said transparent wrapping about said yarn and said knitting needles, and a series of surprises incorporated within said ball of yarn for discovery one at a time as the yarn is unwound for promoting the use of the yarn in knitting.

5. An educational or instructive child's knitting kit comprising a ball of yarn, a series of prizes incorporated within said ball of yarn and adapted to be uncovered one at a time as the yarn is used, a pair of knitting needles, and a wrapping confining said ball and said knitting needles in a package.

6. A decorative, educational device comprising a package including a ball of multi-colored yarn and a central core, said yarn being wound upon said core and about itself, a series of prizes distributed within said yarn between said core and its exterior, a pair of knitting needles, and a wrapper confining said ball and said knitting needles together.

7. A decorative, educational device comprising a ball of multi-colored yarn, a series of prizes incorporated within said ball of yarn, a pair of knitting needles, and means for attaching said ball of yarn and knitting needles together.

References Cited in the file of this patent

FOREIGN PATENTS 189,126     Switzerland _____ May 1, 1937